United States Patent
Kang et al.

(10) Patent No.: US 10,027,951 B2
(45) Date of Patent: Jul. 17, 2018

(54) 3D GLASSES AND METHOD FOR CONTROLLING THE SAME

(75) Inventors: Hee-beom Kang, Suwon-si (KR);
Jae-woo Kim, Suwon-si (KR);
Myeong-gu Lee, Yongin-si (KR);
Seung-hoon Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1064 days.

(21) Appl. No.: 13/244,505

(22) Filed: Sep. 25, 2011

(65) Prior Publication Data

US 2012/0081363 A1 Apr. 5, 2012

(30) Foreign Application Priority Data

Sep. 30, 2010 (KR) .................. 10-2010-0095405

(51) Int. Cl.
*H04N 13/04* (2006.01)
*H04N 9/47* (2006.01)

(52) U.S. Cl.
CPC ....... *H04N 13/0429* (2013.01); *H04N 13/044* (2013.01); *H04N 13/0438* (2013.01); *H04N 2213/008* (2013.01)

(58) Field of Classification Search
CPC .............................. G02B 27/017; H04N 13/044
USPC ............................................................ 348/51
See application file for complete search history.

(56) References Cited

U.S. PATENT DOCUMENTS

| | | | |
|---|---|---|---|
| 7,598,927 B2* | 10/2009 | Yamazaki et al. | 345/7 |
| 8,306,267 B1* | 11/2012 | Gossweiler et al. | 382/103 |
| 2006/0115130 A1 | 6/2006 | Kozlay | |
| 2006/0132915 A1* | 6/2006 | Yang et al. | 359/463 |
| 2009/0174946 A1* | 7/2009 | Raviv et al. | 359/632 |
| 2009/0189974 A1* | 7/2009 | Deering | 348/46 |
| 2010/0254017 A1* | 10/2010 | Martins | 359/631 |
| 2011/0012896 A1* | 1/2011 | Ji | 345/419 |
| 2011/0032330 A1* | 2/2011 | Kim et al. | 348/43 |
| 2011/0032476 A1* | 2/2011 | Brown et al. | 351/169 |
| 2011/0199466 A1* | 8/2011 | Kim et al. | 348/55 |

FOREIGN PATENT DOCUMENTS

JP 2004219472 A 8/2004
JP 2010-62767 A 3/2010

OTHER PUBLICATIONS

Communication dated Jan. 18, 2012 by the European Patent Office in the counterpart European Patent Application No. 11183204.4.
(Continued)

*Primary Examiner* — Chikaodili E Anyikire
(74) *Attorney, Agent, or Firm* — Sughrue Mion, PLLC

(57) ABSTRACT

3D glasses which can individually acquire information according to 3D content that users view. The 3D glasses include a transparent display unit displaying at least one of information on 3D content and a control screen for controlling a 3D display device on a 3D glasses unit, a transmission/reception unit receiving at least one of the information on the 3D content and the control screen for controlling the 3D display device from the 3D display device and transmitting the received signal to the transparent display unit, and a control unit controlling the transparent display unit to display the information on the 3D content or the control screen for controlling the 3D display device.

30 Claims, 14 Drawing Sheets

(56) References Cited

OTHER PUBLICATIONS

Communication dated Jul. 16, 2015, by the European Patent Office in the counterpart European Patent Application No. 11183204.4.
Communication dated Jul. 1, 2016 issued by the Korean Intellectual Property Office in counterpart Korean Patent Application No. 10-2010-0095405.

* cited by examiner

3D GLASSES AND METHOD FOR CONTROLLING THE SAME

CROSS-REFERENCE TO RELATED APPLICATION

This application claims priority from Korean Patent Application No. 2010-0095405, filed on Sep. 30, 2010, in the Korean Intellectual Property Office, the disclosure of which is incorporated herein by reference in its entirety.

BACKGROUND

1. Field

Apparatuses and methods consistent with exemplary embodiments relate to 3D glasses for viewing a 3D image, 3D glasses using stereo shutter glasses, and a method for controlling the same.

2. Description of the Related Art

In a related art, a 3D effect occurs through complex actions of the degree of change in thickness of a crystalline lens according to the position of an object to be observed, a difference in angle between both eyes and an object, a difference in position and shape of an object between left and right eyes, disparity occurring in accordance with the movement of an object, and other effects caused by various kinds of psychologies and memories.

Among them, the binocular disparity that occurs due to a specified distance between two human eyes may be the most important factor. Due to the binocular disparity, two eyes see the same object at different angles, and due to this difference in angle between the two eyes, different images are formed on the two eyes, respectively. These two images are transferred to viewer's brain through the retinas, and the brain accurately harmonizes these two kinds of information, resulting in the viewer feeling the original 3D stereoscopic image.

On the other hand, in order to view a 3D image display device, a glasses type that uses special glasses and a non-glasses type that does not use the special glasses may be used. The glasses type may be divided into a color filter type that separates and selects an image using a color filter, a polarizing filter type that separates an image into a left-eye image and a right-eye image using a shield effect caused by a combination of orthogonal polarizing elements, and a shutter glasses type that alternately intercepts a left eye and a right eye in accordance with a sync signal for projecting a left-eye image signal and a right-eye image signal onto a screen to make the viewer feel the 3D effect.

Among them, the shutter glasses type is a display method using the disparity between both eyes, in which images observed at different angles enable the brain to recognize the sense of space through synchronization of the image providing of the display device with an on/off operation of the left and right eyes of the glasses.

However, since the shutter glasses type glasses in the related art merely receive only the sync signal with the 3D display device and perform only an on/off operation of the left and right eyes, they have the problem that plural users can acquire only the same display information through the same glasses.

Also, since respective users have different bio conditions, such as binocular structure, perspective, recognition difference, and the like, the bio conditions for the respective users should be newly set in the case of viewing an image through the 3D glasses which causes inconvenience to the users.

SUMMARY

One or more exemplary embodiments may address at least the above problems and/or disadvantages and may provide at least the advantages described below. Accordingly, an aspect of an exemplary embodiment provides 3D glasses and a method for controlling the same, which can individually acquire information according to 3D content that users view.

According to one aspect of the present invention, 3D glasses include a transparent display unit displaying at least one of information on 3D content and a control screen for controlling a 3D display device on a 3D glasses unit; a transmission/reception unit receiving at least one of the information on the 3D content and the control screen for controlling the 3D display device from the 3D display device, and transmitting the received signal to the transparent display unit; and a control unit controlling the transparent display unit to display the information on the 3D content or the control screen for controlling the 3D display device.

Here, the transparent display unit may be a transparent active matrix organic light emitting diode (AMOLED), and the transmission/reception unit may be a wireless transmission/reception device using Bluetooth or infrared rays.

Also, the control unit may include at least one button for controlling the transparent display unit to display at least one of the information on the 3D content and the control screen for controlling the 3D display device.

Here, the at least one button may include at least one of a power button, a button for connection between the 3D display device and the 3D glasses, and selection buttons for displaying a main menu screen for providing the information on the 3D content and the control screen for controlling the 3D display device.

Also, the information on the 3D content may include at least one of information on a director and actors related to content that is viewed, caption setting information, outline information, and making film information.

The 3D glasses according to an exemplary embodiment of the invention may further include a sensor sensing unit sensing user's motion on virtual coordinates and controlling the information on the 3D content or a function of the control screen.

Here, the transmission/reception unit may transmit a control signal for controlling the 3D display device, to the 3D display device according to the user's motion sensed by the sensor sensing unit.

Also, the sensor sensing unit may sense the user's motion by sensing a sensor attached to a user.

Here, the transparent display unit may be positioned in a predetermined area of the 3D glasses unit, and may be a lens for display.

The 3D glasses according to an exemplary embodiment may further include a user recognition unit recognizing a user of the 3D glasses.

Here, the user recognition unit may be at least one of a fingerprint sensing sensor sensing a fingerprint of the user and an iris sensing sensor sensing the iris of the user.

Also, the transmission/reception unit may transmit user recognition information recognized by the user recognition unit to the 3D display device, and may receive bio information preset for each user from the 3D display device.

According to another aspect of an exemplary embodiment, a method for controlling 3D glasses includes, if at least one of information on 3D content and a control screen for controlling a 3D display device is received from the 3D display device, displaying at least one of the information on the 3D content and the control screen for controlling the 3D display device on a transparent display unit of a 3D glasses unit; and controlling the transparent display unit to display at least one of the information on the 3D content and the control screen for controlling the 3D display device.

Here, at least one of the information on the 3D content and the control screen for controlling the 3D display device may be received from the 3D display device using Bluetooth or infrared rays.

Also, the operation of controlling the transparent display unit may include controlling the transparent display unit to display the information on at least one of the 3D content and the control screen for controlling the 3D display device, using at least one button.

Here, the at least one button may include at least one of a power button, a button for connection between the 3D display device and the 3D glasses, and selection buttons for displaying a main menu screen for providing the information on the 3D content and the control screen for controlling the 3D display device.

Also, the information on the 3D content may include at least one of information on a director and actors related to content that is viewed, caption setting information, outline information, and making film information.

The method for controlling 3D glasses according to an exemplary embodiment may further include sensing user's motion on virtual coordinates and controlling the information on the 3D content or a function of the control screen.

Here, the method for controlling 3D glasses according to an exemplary embodiment may further include controlling the 3D display device according to the sensed user's motion.

Also, the user's motion may be sensed by a sensor attached to a user.

The method for controlling 3D glasses according to an exemplary embodiment may further include recognizing at least one of a user by a fingerprint sensing sensor and an iris sensing sensor.

Here, the method for controlling 3D glasses according to an exemplary embodiment may further include transmitting at least one of user recognition information sensed by the fingerprint sensing sensor and the iris sensing sensor, to the 3D display device, and receiving bio information preset for each user from the 3D display device.

According to another aspect of an exemplary embodiment, a method of displaying content in an area of 3D glasses includes registering 3D glasses at a 3D display device, at the 3D glasses, receiving the content based on information used to register the 3D glasses, and at the area of the 3D glasses, displaying said content.

Here, the content may be displayed in a menu.

The content may be selected by activating at least one button on the 3D glasses, and the area of the 3D glasses may be predetermined.

According to various exemplary embodiments of the invention, information according to 3D content that users view can be individually acquired.

BRIEF DESCRIPTION OF THE DRAWINGS

The above and other aspects will be more apparent from the following detailed description of exemplary embodiments, taken in conjunction with the accompanying drawings, in which.

DETAILED DESCRIPTION OF EXEMPLARY EMBODIMENTS

Hereinafter, exemplary embodiments are described in detail with reference to the accompanying drawings. For reference, in explaining exemplary embodiments, well-known functions or constructions will not be described in detail so as to avoid obscuring the description with unnecessary detail.

Figure 1:
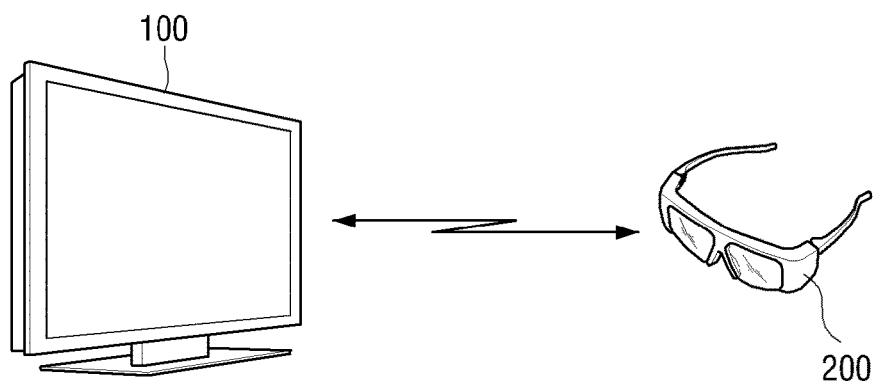
FIG. 1 is a view illustrating a 3D image providing system including 3D glasses according to an exemplary embodiment.

FIG. 1 is a view illustrating a 3D image providing system including 3D glasses according to an exemplary embodiment. As illustrated, a 3D image providing system includes a 3D display device 100 for displaying a 3D image on a screen and 3D glasses 200 for viewing the 3D image.

The 3D display device 100 may be implemented to display the 3D image. For example, it may be implemented to display a 2D image or a 3D image.

In the case where the 3D display device 100 displays a 2D image, the same method as that in the existing 2D display device may be used, and in the case where the 3D display device 100 displays a 3D image, it receives a 3D image that is received from an image pickup device such as a camera or a 3D image that is captured by a camera, edited/processed and output by a broadcasting station, processes, and displays the 3D image on the screen. In particular, the 3D display device 100 processes a left-eye image and a right-eye image with reference to the format of a 3D image, and makes the processed left-eye image and right-eye image time-divided and displayed alternately.

The 3D glasses 200 may be implemented by active type shutter glasses. That is, the shutter glasses may be used to generate the binocular disparity in such a way that the shutter glasses pass or intercept the left-eye and right-eye images transferred from the display device 100 as a controller chip recognizes the images and rapidly opens/closes liquid crystals.

Hereinafter, the structure of the 3D glasses according to an exemplary embodiment will be described in detail.

Figure 2:
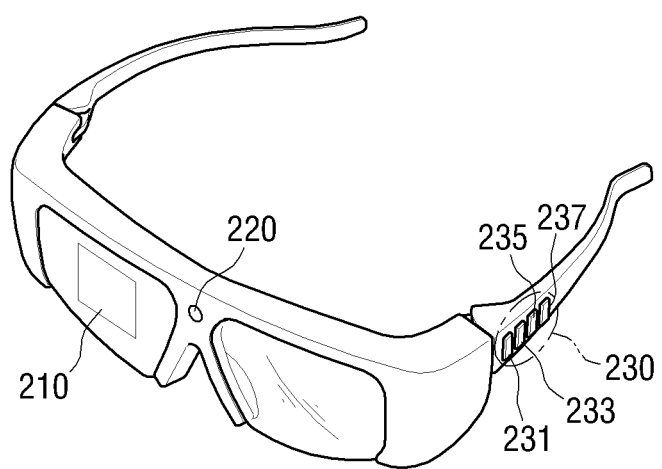
FIG. 2 is a view illustrating the structure of 3D glasses according to an exemplary embodiment.

FIG. 2 is a view illustrating the structure of 3D glasses according to an exemplary embodiment.

As illustrated, the 3D glasses 200 include a transparent display unit 210, a transmission/reception unit 220, and a control unit 230.

The transparent display unit 210 displays at least one of information on 3D content and a control screen for controlling the 3D display device 100 on a 3D glasses unit.

Here, the transparent display unit 210 may be positioned in any one of both eyes of the 3D glasses unit, or may be positioned in both eyes of the 3D glasses unit.

Here, the transparent display unit 210 may be a transparent AMOLED. However, the present invention is not limited thereto, and diverse transparent display devices may be used as the transparent display unit 210.

The transmission/reception unit 220 receives the information on the 3D content from the 3D display device 100, and transmits the received information to the transparent display unit 210.

In other words, the transmission/reception unit 220 may receive a sync signal transmitted from the display device 100 or the information on the 3D content.

Here, the transmission/reception unit 220 may be a wireless transmission/reception device using Bluetooth or infrared rays.

On the other hand, although it is exemplified that the transmission/reception unit is a wireless transmission/reception device in FIG. 2, the transmission/reception unit may be a wired transmission/reception device connected by wire to the display device.

The control unit 230 controls the transparent display unit 210 to display the information on the 3D content or the control screen for controlling the 3D display device 100, and as illustrated in FIG. 2, may include a power button, a connection button 233, a selection button 235, and a shift button 237.

The power button 231 operates to control an on/off operation of the power of the 3D glasses.

The connection button 233 operates to control connection between the 3D display device 100 and the 3D glasses 200.

The selection button 235 operates to display a main screen for providing the information on the 3D content or the control screen for controlling the 3D display device.

The shift button 237 operates to shift between the main screen displayed by the selection button 235 and menus of the control screen.

Hereinafter, a process of registering 3D glasses according to an exemplary embodiment in the 3D display device will be described in detail with reference to FIGS. 3A to 3C and 4.

Figure 3A:
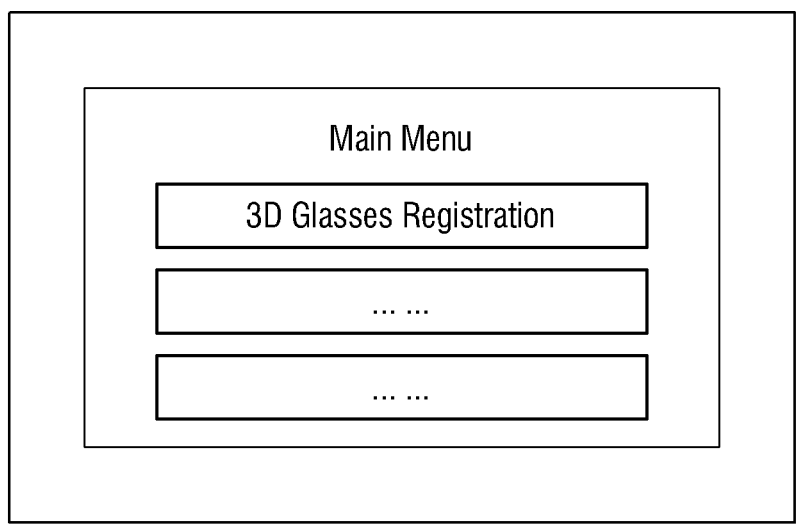
FIGS. 3A to 3C are diagrams illustrating menu screens displayed on a 3D display device in the case where 3D glasses according to an exemplary embodiment is registered in the 3D display device.
Figure 3B:
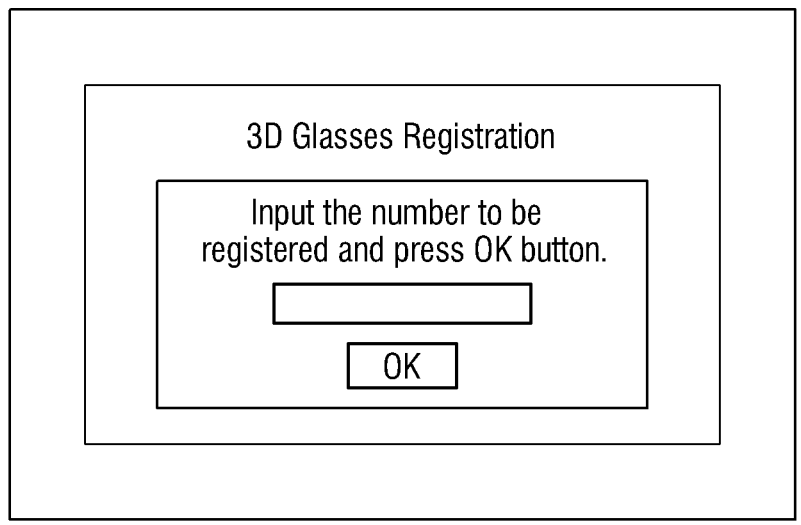
Figure 3C:
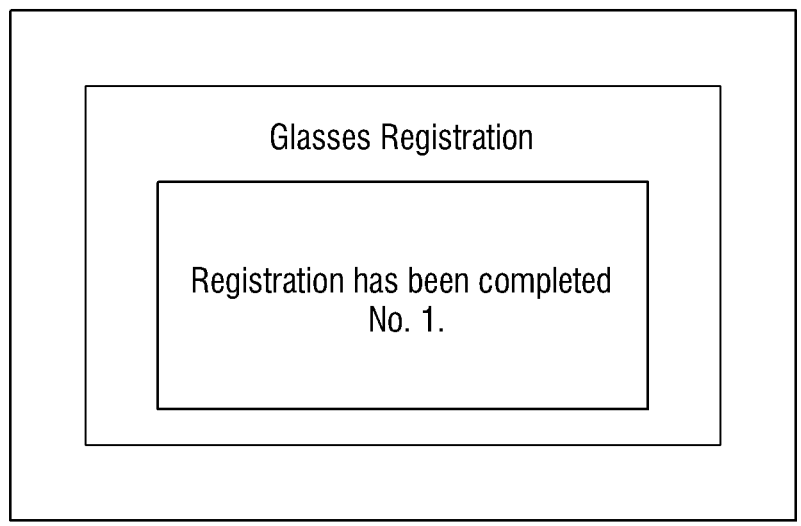
Figure 4:
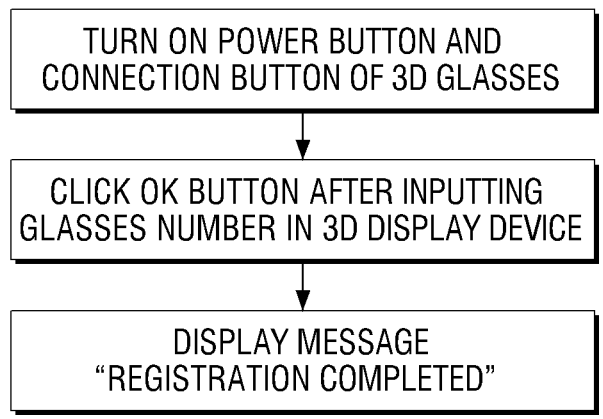
FIG. 4 is a diagram illustrating a process of registering 3D glasses according to an exemplary embodiment in a 3D display device.

FIGS. 3A to 3C are diagrams illustrating menu screens displayed on a 3D display device in the case where 3D glasses according to an embodiment is registered in the 3D display device, and FIG. 4 is a diagram illustrating a process of registering 3D glasses according to an embodiment in a 3D display device.

In order to register the 3D glasses according to an embodiment in the 3D display device, the 3D glasses should be registered in the 3D display device, and in this case, menu screens as illustrated are displayed on the 3D display device.

First, the power button 231 and the connection button 233 of the 3D glasses are turned on, a menu screen as illustrated in FIG. 3A is displayed on the 3D display device, and a menu "3D glasses registration" is selected from the displayed menu screen.

Then, in a state where a menu screen as illustrated in FIG. 3B is displayed, the number of the 3D glasses to be used is input, and then an OK button is clicked.

Next, a 3D glasses registration completion message as illustrated in FIG. 3C is displayed.

Hereinafter, a process of displaying the information on the 3D content in the 3D glasses according to an exemplary embodiment will be described in detail with reference to FIGS. 5 and 6.

Figure 5:
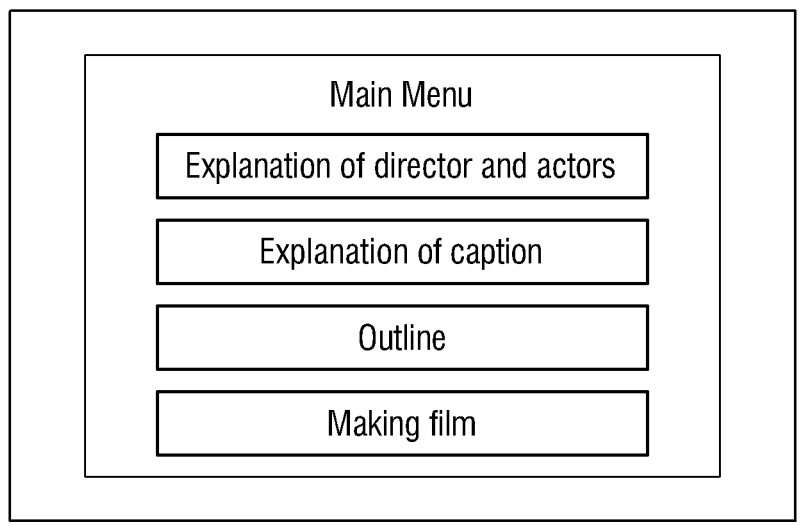
FIG. 5 is a diagram illustrating a main menu screen that is displayed on a transparent display unit of 3D glasses according to an exemplary embodiment.
Figure 6:
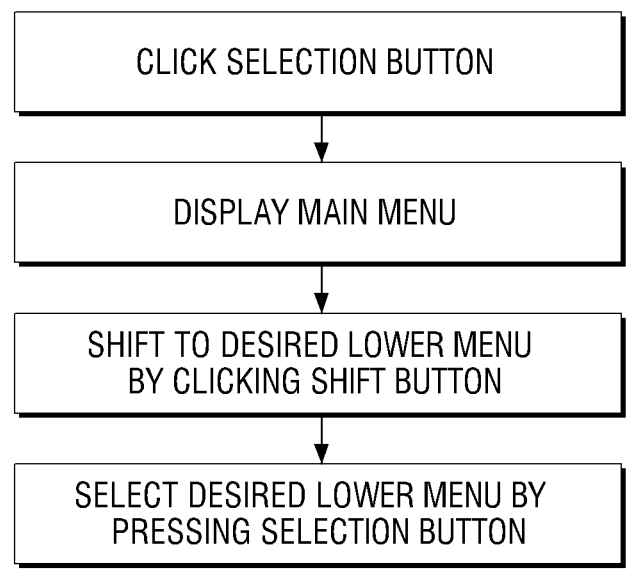
FIG. 6 is a diagram illustrating an exemplary process of selecting a lower menu of a main menu that is displayed as shown in FIG. 5, in 3D glasses.

FIG. 5 is a diagram illustrating a main menu screen that is displayed on a transparent display unit of 3D glasses according to an exemplary embodiment, and FIG. 6 is a diagram illustrating a process of selecting a lower menu of a main menu that is displayed as shown in FIG. 5 in the 3D glasses.

As illustrated in FIG. 5, the 3D glasses according to an exemplary embodiment may display a main menu screen, which includes information on a director and actors related to content that is viewed, caption setting information, outline information, and making film information, on the transparent display unit as the information on the 3D content.

For example, in the case of viewing a 3D movie, an explanation on a director, the whole outline of the movie, making of the film, and the like, can be provided, and in the case where the caption currently set in the 3D display device is English, caption setting for displaying a Hangul caption on the transparent display unit of the 3D glasses can be performed. Also, in the case of viewing a 3D sports broadcast, careers of players, team information, and the like, can be provided; and in the case of a drama, the whole outline, information on the performers, and the like, can be provided.

In addition to the lower menus included in the main menu as illustrated in FIG. 5, diverse information related to the 3D content may be included as lower menus of the main menu.

For example, if the selection button 235 is clicked, a main menu screen as illustrated in FIG. 5 is displayed on the transparent display unit of the 3D glasses, and by clicking the shift button 237 once and again, the menu screen can be shifted to lower menus. Also, in the case of selecting a desired lower menu, the desired lower menu can be selected by pressing the selection button 235.

Accordingly, the 3D glasses according to an exemplary embodiment can provide the information on the 3D content by 3D glasses registered in the 3D display device, and thus can freely provide the information on the 3D contents by users regardless of other users.

Referring again to FIG. 1, the 3D glasses 200 according to an exemplary embodiment may further include a sensor sensing unit (not illustrated) that senses user's motion on virtual coordinates and controls the information on the 3D content or a function of the control screen.

Here, the sensor sensing unit may sense the user's motion by sensing a sensor attached to the user.

Also, the transparent display unit may be positioned in a predetermined area of the 3D glasses unit, and may be a lens for display. In one exemplary embodiment, the transparent display unit is positioned in the predetermined area of the lower end portion of the 3D glasses unit. However, exemplary embodiments of the present invention are not limited thereto, and the transparent display unit may be positioned in any other area of the 3D glasses unit.

In other words, the transparent display unit may be a lens that displays a control screen to the user.

Also, the transmission/reception unit 220 may transmit a control signal for controlling the 3D display device 100, to the 3D display device 100 according to the user's motion sensed by the sensor sensing unit.

In other words, the user's motion is sensed by sensing the sensor that is worn at the end of a user's finger, and a control signal for controlling the information on the 3D content or the control screen for controlling the 3D display device, is transmitted to the 3D display device.

Hereinafter, a method for displaying the control screen in the 3D glasses according to an exemplary embodiment will be described in detail with reference to FIGS. 7 and 8A to 8C.

Figure 7:
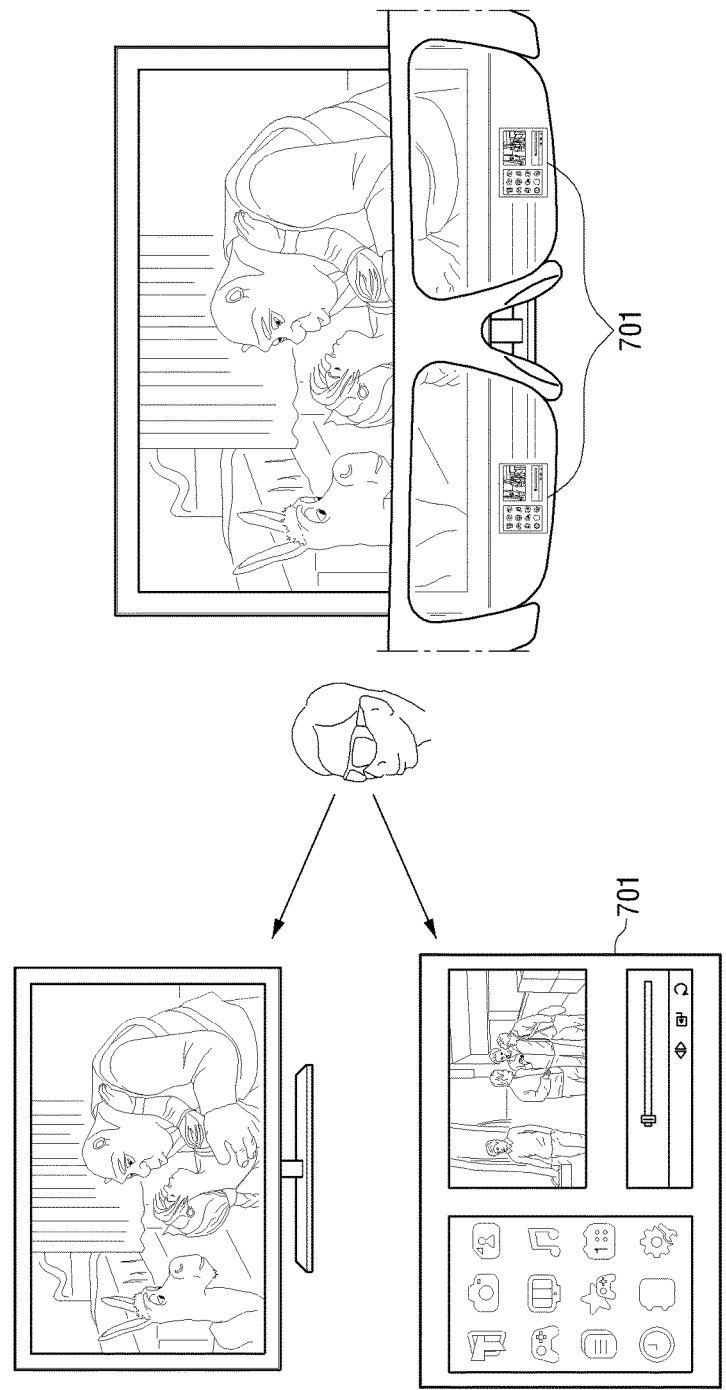
FIG. 7 is a view illustrating a control screen that is displayed in 3D glasses according to an exemplary embodiment.
Figure 8A:
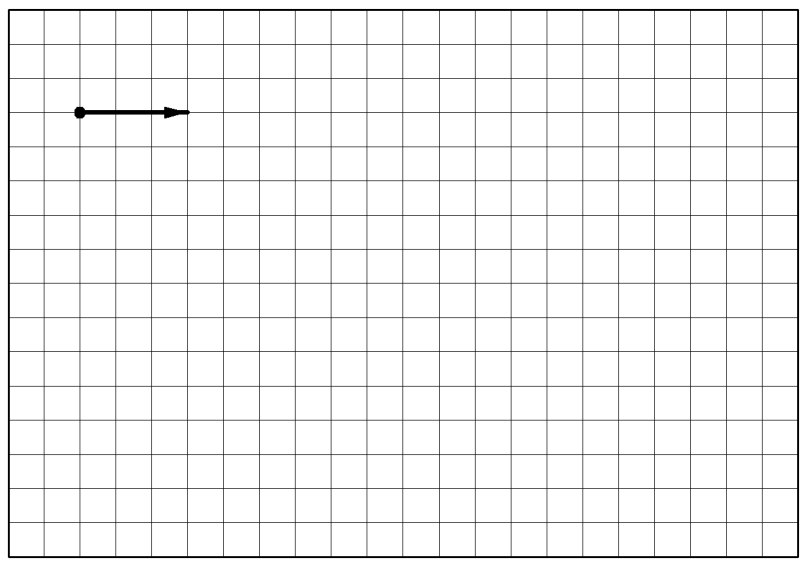
FIGS. 8A to 8C are diagrams illustrating the matching of user's motion sensed by a sensor sensing unit in 3D glasses with icons in a control screen according to an exemplary embodiment.
Figure 8B:
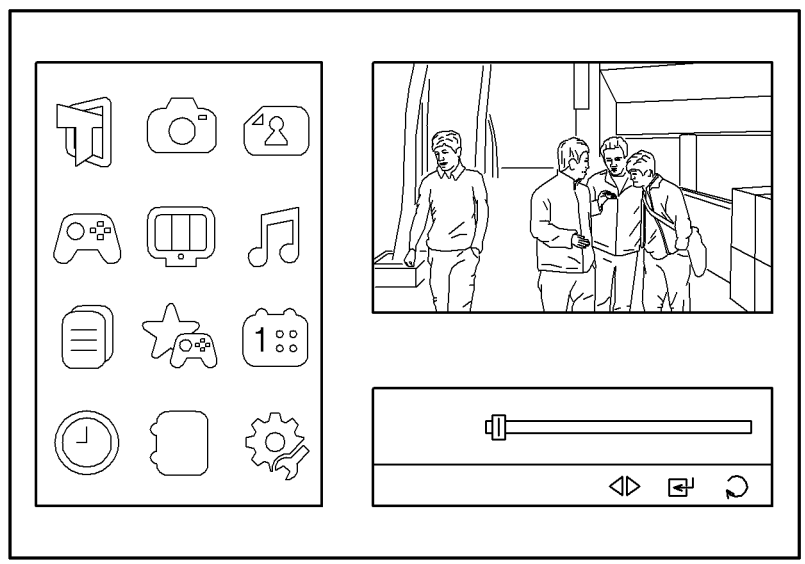
Figure 8C:
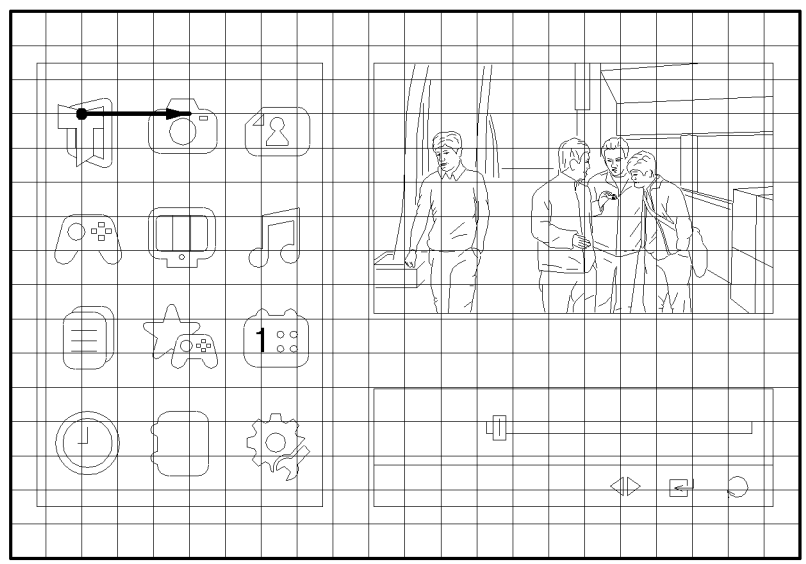

FIG. 7 is a view illustrating a control screen that is displayed in 3D glasses according to an exemplary embodiment, and FIGS. 8A to 8C are diagrams illustrating the matching of user's motion sensed by a sensor sensing unit in 3D glasses with icons in a control screen according to an exemplary embodiment.

As illustrated in FIG. 7, in the 3D glasses, in addition to an image that is displayed on the 3D display device, a control screen 701 for controlling the 3D display device is positioned on a predetermined area of the lower end portion of the 3D glasses unit. On the other hand, the position of the control screen according to an exemplary embodiment is not limited to the position of the control screen as illustrated in FIG. 7, and may be any other area in the 3D glasses unit.

Here, FIG. 8A illustrates coordinates of the sensor attached to the user that is recognized by the sensor sensing unit of the 3D glasses according to the user's motion, and FIG. 8B illustrates the control screen of the 3D display device that is displayed on the transparent display unit of the 3D glasses. FIG. 8C illustrates the matching of the movement of the sensor attached to the user in the coordinate range illustrated in FIG. 8A with control icons on the control screen illustrated in FIG. 8B.

Referring again to FIG. 1, the 3D glasses 200 according to an exemplary embodiment may further include a user recognition unit (not illustrated) recognizing the user of the 3D glasses. For example, the user recognition unit may be a fingerprint sensing sensor sensing a fingerprint of the user or an iris sensing sensor sensing the iris of the user.

Here, the transmission/reception unit 220 may transmit user recognition information recognized by the user recognition unit (not illustrated) to the 3D display device, and may receive bio information preset for each user from the 3D display device.

In other words, by adding an automatic user recognition function by the fingerprint sensing sensor or the iris sensing sensor to the 3D glasses, diverse users can view 3D images based on the same optimum conditions through the same 3D glasses. For example, initial set values are stored according to bio conditions, such as the binocular disparity, perspective, recognition difference, the degree of dizziness, and the like, and in the case of using the 3D glasses, the 3D glasses automatically recognizes a user and sets the state that is optimized to the user to enable the user to view the 3D image at the same optimum conditions. Also, in the case of using the automatic user recognition function more extensively, by predetermining channels according to the user's preference conditions and optimizing the setting conditions of the display device to match the user's taste, the users can view the 3D images more conveniently and easily.

Hereinafter, the structure of the 3D glasses according to another exemplary embodiment will be described in detail.

Figure 9:
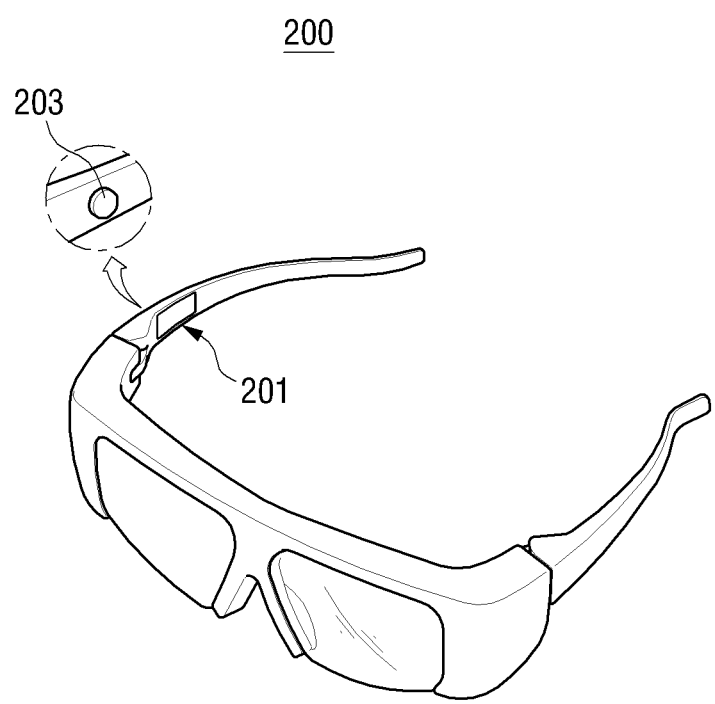
FIG. 9 is a view illustrating the structure of 3D glasses according to another exemplary embodiment.

FIG. 9 is a view illustrating the structure of 3D glasses according to another exemplary embodiment.

As illustrated, the 3D glasses 200 according to another exemplary embodiment may include a fingerprint sensing sensor 201 as a user recognition unit and a power button 203.

For example, the fingerprint sensing sensor 201 may sense the fingerprint of the thumb of the right hand, and the power button 203 that is positioned on the opposite side to the fingerprint sensing sensor 201 may be turned on/off by the index finger of the right hand.

Also, while the user is wearing the 3D glasses according to another exemplary embodiment using the thumb and the index finger to view the 3D image, the fingerprint sensing sensor mounted on the rim of the 3D glasses may sense and determine the user of the 3D glasses and transmit user recognition information to the 3D display device using wireless communication. In this case, the 3D display device may confirm the user information pre-stored by the user, and transmit user's bio conditions and preference conditions which are optimized to the user's viewing of the 3D image to the 3D glasses.

Hereinafter, a method of using the 3D glasses according to another exemplary embodiment will be described.

First, the initial user registration process is performed as follows. While the user holds the 3D glasses having a fingerprint sensing sensor mounted thereon with both hands, turns on the power of the 3D glasses with the index finger, and then wears the glasses, the fingerprint of the thumb may be sensed and a menu for items related to the 3D image setting may be displayed on the screen of the 3D display device as a popup. Here, the 3D display device may display 3D test samples pre-stored for optimum condition setting by 3D users and 3D setting items so that the user can select items such as depth and the like. When the menu for the items related to the 3D image setting is displayed as a popup, the user may set the optimum conditions in accordance with a user's convenience through a remote controller, and press a confirmation button against an inquiry about whether to complete final user registration. In this case, the user's fingerprint information input to the 3D glasses may be transmitted to the 3D display device through the wireless communication such as ZigBee/Wi-Fi/Bluetooth, and may be automatically stored in accordance with the user's name or the order of an internal memory. At this time, as an additional option, a preferential search channel may be set according to the user's convenience or various functions of the 3D display device may be set according to the user's taste.

Next, a process of viewing the 3D image through the 3D glasses worn by the initially registered user will be described. While the user holds the 3D glasses having the fingerprint sensing sensor mounted thereon with both hands, turns on the power of the 3D glasses with the index finger, and then wears the glasses, the fingerprint of the thumb is sensed and fingerprint information is wirelessly transmitted from the 3D glasses to the 3D display device. The 3D display device automatically sets the 3D image optimum conditions of the registered user and an additional convenience function for the 3D display device, and first displays the preferential search channel registered by the user.

Next, a case where another user uses the 3D glasses during viewing of the 3D image will be described. If another user takes and uses the 3D glasses while the first registered user uses the 3D glasses, an initial user registration menu is displayed as a popup, and if there is no fingerprint information initially registered, the user registration is performed or the user registration is skipped in accordance with the user decision on whether to perform the user registration. On the other hand, if the user is the registered user, the 3D setting conditions and other setting conditions are automatically changed to optimize the setting of the 3D glasses to the new user.

Accordingly, it is not required to optimize the 3D glasses by users to view the 3D image, and the 3D image can be provided to the user in an optimum state to meet the new user.

Figure 10:
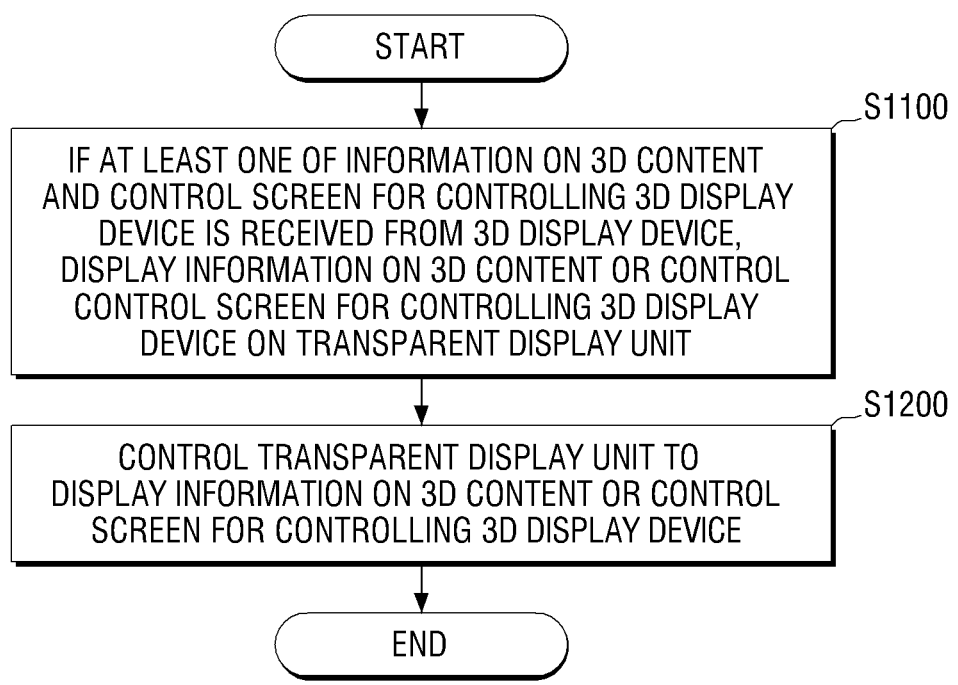
FIG. 10 is a flowchart illustrating a method for controlling 3D glasses according to an exemplary embodiment.

FIG. 10 is a flowchart illustrating a method for controlling 3D glasses according to an exemplary embodiment.

First, if at least one of the information on the 3D content and the control screen for controlling the 3D display device is received from the 3D display device, the information on the 3D content or the control screen for controlling the 3D display device is displayed on the transparent display unit of the 3D glasses unit (S1100).

Here, the information on the 3D content or the control screen may be received from the 3D display device using Bluetooth or infrared rays.

Also, the information on the 3D content may include at least one of information on a director and actors related to content that is viewed, caption setting information, outline information, and making film information.

Next, the transparent display unit is controlled to display the information on the 3D content or the control screen for controlling the 3D display device (S1200).

In an exemplary embodiment, the operation of controlling the transparent display unit (S1200) may include controlling the transparent display unit to display the information on the 3D content or the control screen for controlling the 3D display device, by at least one button.

Here, the at least one button may include at least one of a power button, a button for connection between the 3D display device and the 3D glasses, and selection buttons for displaying a main menu screen for providing the information on the 3D content and the control screen for controlling the 3D display device.

Here, the method for controlling 3D glasses according to an exemplary embodiment may further include sensing a user's motion on virtual coordinates and controlling the information on the 3D content or a function of the control screen.

Also, the method for controlling 3D glasses according to an exemplary embodiment may further include controlling the 3D display device according to the sensed user's motion.

Here, the user's motion may be sensed by a sensor attached to the user.

Also, the method for controlling 3D glasses according to an exemplary embodiment may further include recognizing the user by a fingerprint sensing sensor or an iris sensing sensor.

Here, the method for controlling 3D glasses according to an exemplary embodiment may further include transmitting user recognition information sensed by the fingerprint sensing sensor or the iris sensing sensor to the 3D display device, and receiving bio information preset for each user from the 3D display device.

Accordingly, the method for controlling the 3D glasses according to an exemplary embodiment can provide the information on the 3D content or the control screen for controlling the 3D display device differently via 3D glasses registered in the 3D display device, and thus can freely provide the information on the 3D contents or the control screen by users regardless of other users.

Also, it is not required to optimize the 3D glasses by users every time to view the 3D image, and the 3D image can be provided to the user in an optimum state to meet the user's taste.

While exemplary embodiments have been shown and described, it will be understood by those skilled in the art that various changes in form and detail may be made therein without departing from the spirit and scope of the invention, as defined by the appended claims.

What is claimed is:

1. Three-dimensional (3D) glasses comprising:
a transparent display unit displaying a control screen including a plurality of control icons for controlling an external 3D display device, on a 3D glasses unit;
a transmission/reception unit receiving a signal related to the control screen including the plurality of control icons for controlling the external 3D display device from the external 3D display device; and
a control unit controlling the transparent display unit to display the control screen corresponding to the received signal, which includes the plurality of control icons for controlling the external 3D display device.

2. The 3D glasses as claimed in claim 1, wherein the transparent display unit is a transparent active-matrix organic light-emitting diode (AMOLED).

3. The 3D glasses as claimed in claim 1, wherein the transmission/reception unit is a wireless transmission/reception device using one of Bluetooth and infrared rays.

4. The 3D glasses as claimed in claim 1, wherein the control unit includes at least one button for controlling the transparent display unit to display the control screen corresponding to the received signal, which includes the plurality of control icons for controlling the external 3D display device.

5. The 3D glasses as claimed in claim 4, wherein the at least one button includes at least one of a power button, a button for connection between the external 3D display device and the 3D glasses, and selection buttons for displaying a main menu screen for providing the control screen corresponding to the received signal, which includes the plurality of control icons for controlling the external 3D display device.

6. The 3D glasses as claimed in claim 1, wherein the control unit further controls the transparent display unit to display information corresponding to 3D content, and
wherein the information corresponding to the 3D content includes at least one of information on a director and actors related to content that is viewed, caption setting information, outline information, and making film information.

7. The 3D glasses as claimed in claim 1, further comprising a sensor sensing unit which senses a user's motion on virtual coordinates and controls a function of the control screen corresponding to the received signal, which includes the plurality of control icons for controlling the external 3D display device.

8. The 3D glasses as claimed in claim 7, wherein the transmission/reception unit transmits a control signal for controlling the external 3D display device to the external 3D display device according to the user's motion sensed by the sensor sensing unit.

9. The 3D glasses as claimed in claim 7, wherein the sensor sensing unit senses the user's motion by sensing a sensor attached to a user.

10. The 3D glasses as claimed in claim 1, wherein the transparent display unit is positioned in a predetermined area of the 3D glasses unit, and is a lens for display.

11. The 3D glasses as claimed in claim 1, further comprising a user recognition unit recognizing a user of the 3D glasses.

12. The 3D glasses as claimed in claim 11, wherein the user recognition unit is at least one of a fingerprint sensing sensor sensing a fingerprint of the user and an iris sensing sensor sensing an iris of the user.

13. The 3D glasses as claimed in claim 11, wherein the transmission/reception unit transmits user recognition information recognized by the user recognition unit, to the external 3D display device, and receives information preset for each user from the external 3D display device.

14. A method for controlling 3D glasses comprising:
if a signal related to a control screen including a plurality of control icons for controlling an external 3D display device is received from the external 3D display device, displaying the control screen corresponding to the received signal, which includes the plurality of control icons for controlling the external 3D display device on a transparent display unit of a 3D glasses unit; and
controlling the transparent display unit to display the control screen corresponding to the received signal, which includes the plurality of control icons for controlling the external 3D display device.

15. The method for controlling 3D glasses as claimed in claim 14, wherein the signal related to the control screen including the plurality of control icons for controlling the external 3D display device, is received from the external 3D display device using one of Bluetooth and infrared rays.

16. The method for controlling 3D glasses as claimed in claim 14, wherein the controlling the transparent display unit includes controlling the transparent display unit to display the control screen corresponding to the received signal, which includes the plurality of control icons for controlling the external 3D display device, using at least one button.

17. The method for controlling 3D glasses as claimed in claim 16, wherein the at least one button includes at least one of a power button, a button for connection between the external 3D display device and the 3D glasses, and selection buttons for displaying a main menu screen for providing the control screen corresponding to the received signal, which includes the plurality of control icons for controlling the external 3D display device.

18. The method for controlling 3D glasses as claimed in claim 14, further comprising controlling the transparent display unit to display information corresponding to 3D content, and
wherein the information corresponding to the 3D content includes at least one of information on a director and actors related to content that is viewed, caption setting information, outline information, and making film information.

19. The method for controlling 3D glasses as claimed in claim 14, further comprising sensing a user's motion on virtual coordinates and controlling a function of the control screen corresponding to the received signal, which includes the plurality of control icons for controlling the external 3D display device.

20. The method for controlling 3D glasses as claimed in claim 19, further comprising controlling the external 3D display device according to the sensed user's motion.

21. The method for controlling 3D glasses as claimed in claim 19, wherein the user's motion is sensed by a sensor attached to a user.

22. The method for controlling 3D glasses as claimed in claim 14, further comprising recognizing a user by at least one of a fingerprint sensing sensor and an iris sensing sensor.

23. The method for controlling 3D glasses as claimed in claim 22, further comprising transmitting user recognition information sensed by the at least one of the fingerprint sensing sensor and the iris sensing sensor, to the external 3D display device, and receiving information preset for each user from the external 3D display device.

24. A method of displaying a control screen including a plurality of control icons for controlling an external 3D display device in an area of 3D glasses, the method comprising:
registering the 3D glasses at the external 3D display device;
at the 3D glasses, receiving a signal related the control screen including the plurality of control icons for controlling the external 3D display device based on information used to register the 3D glasses; and
at the area of the 3D glasses, displaying the control screen corresponding to the received signal, which includes the plurality of control icons for controlling the external 3D display device.

25. The method according to claim 24, wherein the control screen corresponding to the received signal, which includes the plurality of control icons for controlling the external 3D display device is displayed in a menu.

26. The method according to claim 24, wherein the control screen corresponding to the received signal, which includes the plurality of control icons for controlling the external 3D display device is selected by activating at least one button on the 3D glasses.

27. The method according to claim 24, wherein the area of the 3D glasses is predetermined.

28. The 3D glasses as claimed in claim 1, wherein the control screen corresponding to the received signal, which includes the plurality of control icons for controlling the external 3D display device comprises additional content with respect to 3D content displayed on the external 3D display device.

29. The method for controlling 3D glasses as claimed in claim 14, wherein the control screen corresponding to the received signal, which includes the plurality of control icons for controlling the external 3D display device comprises additional content with respect to 3D content displayed on the external 3D display device.

30. The method according to claim 24, wherein the control screen corresponding to the received signal, which includes the plurality of control icons for controlling the external 3D display device comprises additional content with respect to 3D content displayed on the external 3D display device.

* * * * *